July 14, 1970   R. L. TREUTHART   3,520,595
OPTICAL BEAM ANGLE GENERATOR

Filed Feb. 29, 1968   2 Sheets-Sheet 1

*INVENTOR.*
ROBERT L. TREUTHART

BY

ATTORNEY

July 14, 1970  R. L. TREUTHART  3,520,595
OPTICAL BEAM ANGLE GENERATOR
Filed Feb. 29, 1968  2 Sheets-Sheet 2

INVENTOR.
ROBERT L. TREUTHART
BY
ATTORNEY

United States Patent Office 3,520,595
Patented July 14, 1970

3,520,595
OPTICAL BEAM ANGLE GENERATOR
Robert L. Treuthart, Villa Park, Calif., assignor to
North American Rockwell Corporation
Filed Feb. 29, 1968, Ser. No. 709,395
Int. Cl. G02b 17/00
U.S. Cl. 350—285        5 Claims

ABSTRACT OF THE DISCLOSURE

A light beam is directed into a block of glass or other appropriate material against which are disposed a number of angle generating heads, such that the light beam is reflected at each generating head position before being transmitted out of the block. At each generating head position, the beam is provided with either of two angles of reflection, depending upon whether or not that head is provided with an actuating signal. For a set of $n$ heads, $n$ signal inputs can provide $2^n$ selections of angle.

BACKGROUND OF THE INVENTION

Field of the invention

The present invention relates to an optical beam angle generator and, more particularly, to means for precisely pointing a light beam in any direction within a relatively large angle at a high rate of speed.

Description of the prior art

Ever since the invention of the laser, many practical uses have been proposed therefor based upon its property of producing a high intensity, highly collimated beam of light. For example, this property makes the laser extremely valuable in optical communication systems and in optical radar systems. However, in order to develop a practical system, a capability for precise pointing of the light beam becomes essential, with a pointing accuracy necessary to the order of a beamwidth. In addition, it is often desirable to develop the capability of directing a light beam through or at a large angle at a high rate, and of freezing the direction of the light beam instantly at any position. An additional desirable feature is the ability to point the light beam with as little time lag as possible from any one position to any other position.

Although the terms are relative, it has not been known heretofore to point a light beam through a large angle at a high rate. Large angles at a low rate are, of course, feasible, as are small angular displacements at a high rate. Small angles are considered here to be of the order of seconds to minutes of arc. The primary method for directing a light beam through a large angle utilizes a mirror which reflects the light beam and is rotated to change the direction of the beam. However, the limitations of such a device are obvious. The mirror is a mechanical structure having a certain mass and a moment of inertia which must be overcome in being rotated from one position to another. Obviously, there is a limit to the rate with which the mirror may be rotated from one position to another and a similar limit to the rate with which the mirror may be stopped at the new position. As a result, although a rotating mirror may be used to point a beam through a large angle, it is apparent that the pointing will be done at a low rate of speed with a significant time lag.

In order to eliminate the problems associated with inertia limited pointing mechanisms, several nonmechanical devices have been proposed for directing a light beam. For example, one proposed technique employs the property of a birefringent crystal splitting a beam into two paths. Such a property can be employed by positioning a plurality of birefringent crystals and polarization rotation elements so that the light beam to be pointed is incident upon a first crystal where it is split into either of two beam paths. Each possible beam path is then incident upon another crystal so as to generate four possible beam paths. The four beam paths are then incident upon four more crystals to provide eight beam paths, etc. By selectively employing one of the two beam paths emergent from each crystal, a single output beam may be derived. However, such a configuration has substantial limitations in that the large number of components through which the light beam must pass results in a substantial number of air-to-solid interfaces and substantial path lengths which necessarily introduce an unreasonable amount of absorption, scattering, and aberration in the output beam. In addition, such a configuration requires a very substantial package size in which to mount the deflection system. A still further limitation is that the number of angular directions of beam (not including zero state deflection) is limited to $n$ directions for $n$ stages of the device.

SUMMARY OF THE INVENTION

According to the present invention there is provided an optical beam angle generator for precisely pointing a light beam with a pointing accuracy on the order of a beamwidth. The present invention permits the generation of a large selection of angle increments at a high rate. A scan through many beamwidths is achieved, not by a sweep of angle, but by a series of generated increments of angle. In addition, the scan pattern can be entered or terminated at any point, providing a random access feature. A wide field search mode can be immediately switched to a narrow target examination mode so as to selectively track a given target. Furthermore, any desired region of the scan pattern can be voided to preserve security of the scanning equipment site. Because of the inherent digital nature of the present device, pointing can be readily computer controlled for target tracking. The scan pattern can be time-shared between two or more separated regions of interest.

In accordance with the present invention, a light beam is directed into a block of glass or other appropriate material against which are disposed a plurality of angle generating heads, such that the light beam is reflected at each generating head position before being transmitted out of the block. Mechanization of the individual angle generating heads is based upon the principle of frustrated total internal reflection at an interface within the block. At each angle generating head position, the light beam is incident at an angle greater than the critical angle so that total internal reflection (TIR) is achieved, such reflection representing the zero angle state of the device. By bringing an adjacent optic into proximity with what is initially a TIR interface, total reflection becomes frustrated, thus developing a less than total reflection and an FTIR type interface to couple light into the adjacent optic. Upon entering the adjacent optic, the light reaches a new TIR interface from which the beam is returned through the closed FTIR gap at a new angle depending upon the slope of the second interface relative to the first. For a set of $n$ heads, $n$ signal inputs can provide $2^n$ selections of angle, including the zero state of the device.

It is apparent that with such a configuration, rather than scanning from one angle to another, angles are truly generated, since intensity is added at the desired new angle as it is subtracted at the old angle, without light appearing at any intermediate angle. In addition, pointing can be accomplished directly from any one angle to any other angle within the range of the device without the requirement for scanning of intermediate angles. Thus, angles are actually generated at the values desired, which condition can be expressed as random access pointing.

As a result of this operation, pointing can be achieved through large angles relative to the prior art at a rate as rapid as pointing through small angles. Of additional significance is that the desirable characteristics of large deflection capability and high speed capability are simultaneously available in combination. Several other advantages accrue from the novel design incorporated herein. An all glass path is feasible, thus minimizing losses by reflection at external surfaces. Since there is no power loss contributing to heating except that due to small bulk absorption in the glass, high beam power densities can be accommodated, making the device compatible with high power, Q-switched lasers. Since, as an overall structure, the pointing device appears optically as a plate containing nothing but planar interfaces, it introduces no abberation into the light beam passed therethrough. In addition, the device is not aperture limited but can be designed for any cross-section of beam.

OBJECTS

It is, therefore, an object of the present invention to provide a novel device for precisely pointing a light beam.

It is a further object of the present invention to provide a novel device for precisely pointing a light beam in any direction within a relatively large angle and at a high rate of speed.

It is a still further object of the present invention to provide a device for scanning a light beam through large angles and freezing direction of the light beam instantly at any position.

It is another object of the present invention to provide an optical beam angle generator for precisely pointing a light beam with an extremely small lag in the time to move from one position to another.

It is still another object of the present invention to provide a beam angle generator which simultaneously includes the properties of permitting pointing of a light beam through large angular displacements and permitting such pointing at high speeds.

Another object of the present invention is the provision of a beam angle generator which permits pointing of a light beam through a large angle in a time no greater than that required to point a beam through a small angle.

Still another object of the present invention is the provision of an optical beam angle generator which permits the pointing of a light beam from any one angle to any other angle within the range of the device to be accomplished directly without the requirement for scanning of intermediate angles.

An additional object of the present invention is the provision of an optical beam angle generator capable of $2^n$ increments of deflection for $n$ generating heads.

Still other objects, features and attendant advantages of the present invention will become apparent to those skilled in the art from a reading of the following detailed description of the preferred embodiments constructed in accordance therewith, taken in conjunction with the accompanying drawings wherein like numerals designate like parts in the several figures and wherein:

DESCRIPTION OF THE PREFERRED EMBODIMENTS

Figure 1A:
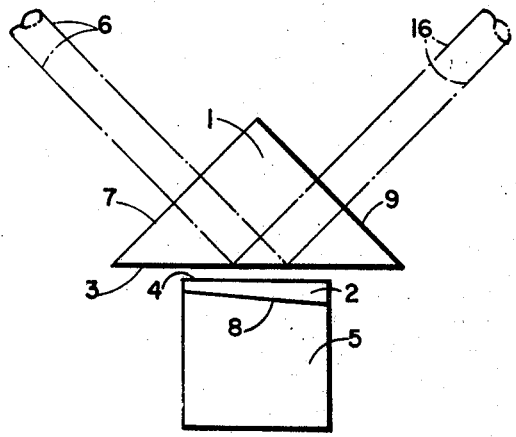
FIGS. 1a and 1b are schematic representations of a mechanical device for switching the path of a beam of light, showing the principle used in the present invention.
Figure 1B:
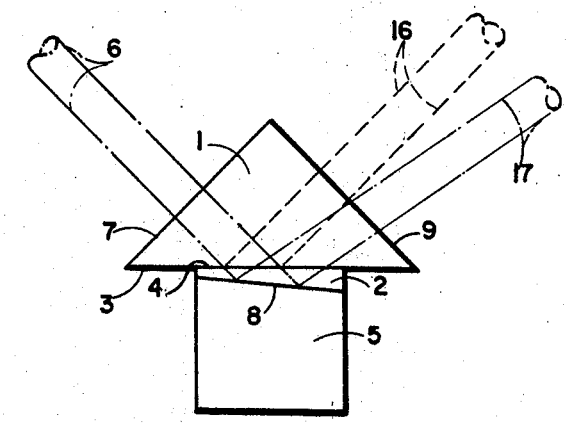

Referring now to the drawings and, more particularly, to FIGS. 1a and 1b thereof, the principles of the present invention may be best understood. In FIGS. 1a and 1b, there is shown two blocks of glass or other transparent media 1 and 2, having plane parallel faces 3 and 4, respectively, which are spaced in a controllable manner. An actuating means, designated 5, is positioned in contact with block 2 to displace block 2 relative to block 1. The incident light beam, designated 6, passes through a face 7 of block 1 and is internally incident on face 3 thereof. Block 2 is in the form a wedge and has a second face 8 which is disposed at an angle with respect to faces 3 and 4, for reasons which will become more apparent hereinafter.

Figure 2:
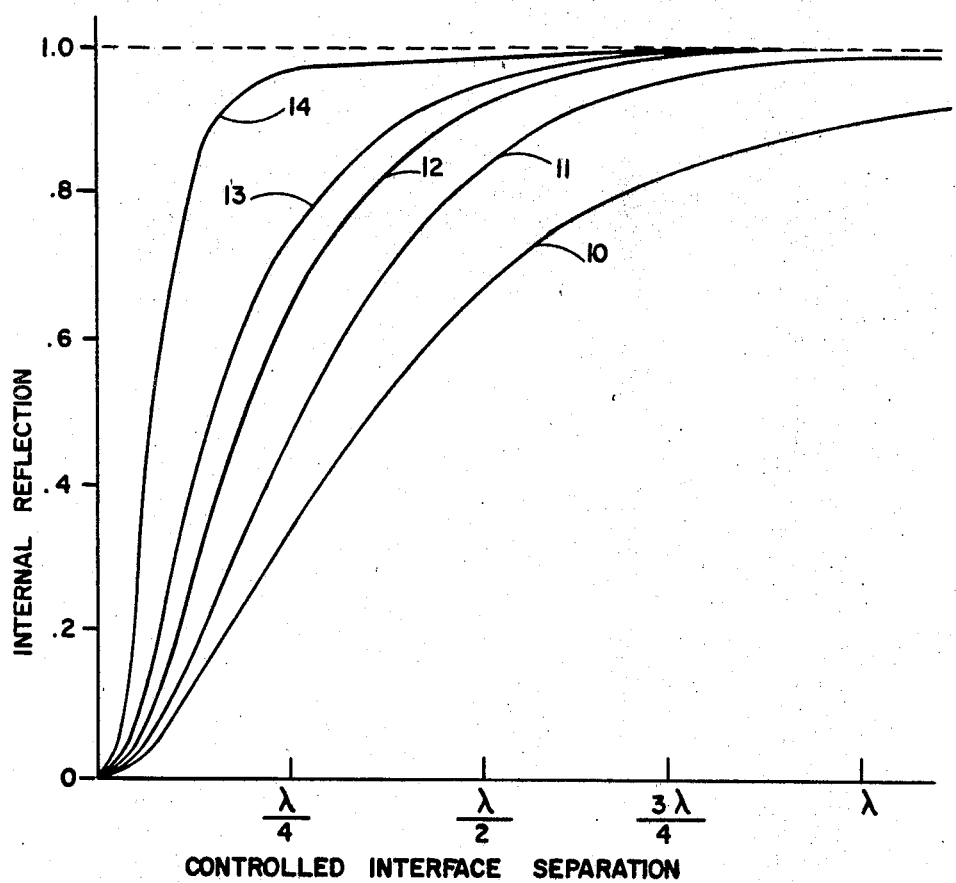
FIG. 2 is a family of curves showing internal reflectance at an interface as a function of the separation between a first and a second surface for several angles of beam incidence.

Since wedge 2 is movable, it is, in effect, an armature. Armature displacements will be substantially within a distance equivalent to one wavelength of the light which is subject to control by the device. The reason for this may be best understood by referring to FIG. 2 which shows a plurality of curves of the transmittance and reflectance at the interface between faces 3 and 4 for various spacings therebetween based upon Fresnel's equations. Curves 10–14 show the variation of internal reflection at the interface as a function of the spacing between faces 3 and 4 for incidence angles of 45°, 50°, 55°, 60°, and 75°, respectively. At spacings of a wavelength or over, substantially no light is coupled from prism 1 to wedge 2 and the internal reflection is total. At spacings less than a wavelength, the total reflection is degenerate, that is, becomes known as frustrated total internal reflection and varies as shown.

Returning to FIGS. 1a and 1b, this phenomenon can be used to switch the path of incident beam 6. In FIG. 1a, with drive element 5 positioning face 4 of wedge 2 at a distance greater than one wavelength from face 3 of prism 1, incident beam 6 is totally reflected by face 3 and exits from a face 9 of prism 1 as an output beam 16. In FIG. 1b, the face 4 of wedge 2 driven into near optical contact with face 3 of prism 1, total internal reflection at face 3 is frustrated so that incident beam 6 passes through face 3 and is reflected from face 8 of wedge 2. The beam then passes through face 3 of wedge 1 and exits from prism 1 through face 9 as an output beam 17 at an angle to beam 16 which is twice the angle between faces 4 and 8.

According to the present invention, an optical beam angle generator may be mechanized by providing a number of angle generating heads which operate on the principle of frustrated total internal reflection, as described with reference to FIGS. 1a and 1b. With face 4 withdrawn from face 3, the condition of total internal reflection is achieved and may represent the zero angle state of the device. When face 4 is brought into near optical contact with face 3, light is reflected from face 8 of wedge 2 which represents the angle generating state of the device. The direction of the return beam is dependent upon the slope of the second interface relative to the first, that is, upon the wedge angle. This built-in angle identifies the angular worth of the generating head. With such a configuration, rather than scanning from one angle to another, angles are truly generated, since intensity is added at the desired new angle as it is subtracted at the old angle, without light appearing at any intermediate angle.

Figure 3:
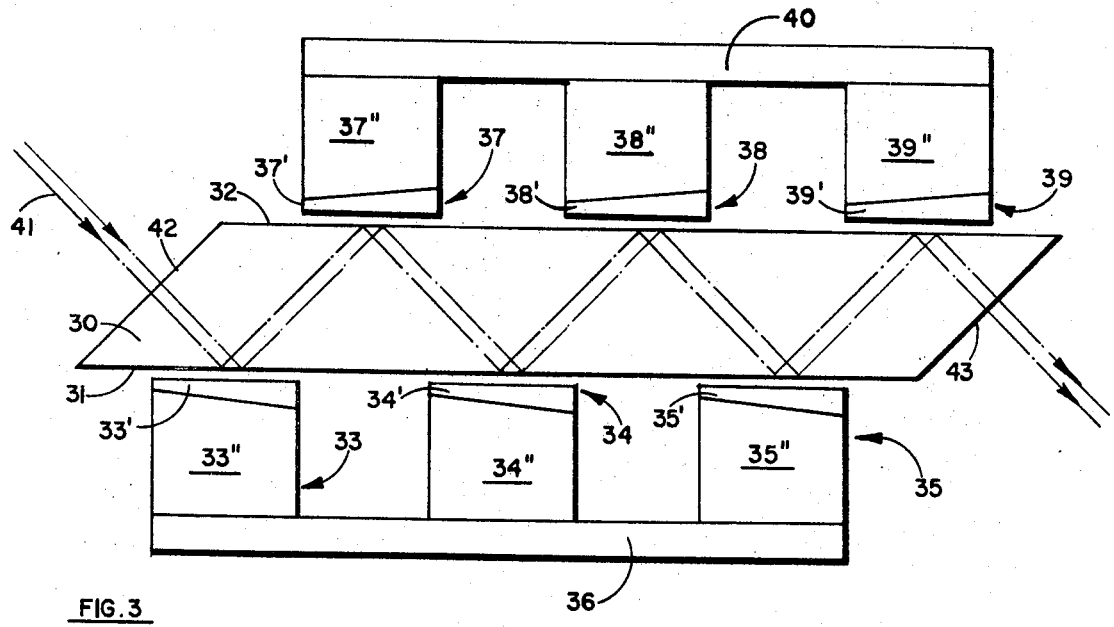
FIG. 3 is a schematic representation of a first embodiment of an optical beam angle generator constructed in accordance with the teachings of the present invention.

Referring now to FIG. 3, there is shown a preferred embodiment of the present beam angle generator comprising a set of discrete angle generators, each of which is a two-state device representing a zero angle (or any built-in bias angle) in one state, and a finite, built-in angle, in the other, angle generating state. A plane parallel slab base block 30 having first and second opposite faces 31 and 32, is provided with a first row of angle generating heads 33–35 supported by a means 36 adjacent first face 31 and a second row of angle generating heads 37–39 supported by a means 40 adjacent second face 32. Angle generating heads 33–35 and 37–39 consist of wedges 33′–35′ and 37′–39′, respectively, having opposite faces, one of which is positioned parallel to faces 31 and 32 and one of which is positioned at a predetermined angle thereto, and drive elements 33″–35″ and 37″–39″, respectively.

In operation, a light beam 41 incident on a face 42 of block 30 is alternately reflected from side to side in block 30 and eventually exits through a face 43 thereof, as shown. In the absence of an actuating signal applied to any of drive elements 33″–35″ and 37″–39″, each of angle generating heads 33–35 and 37–39 is in the zero angle state and an open gap exists between faces 31 and 32 and heads 33–35 and 37–39. When this occurs, light beam 41 is totally internally reflected by faces 31 and 32 and exits through face 43 of block 30 as an output beam. This condition represents the zero state of the device. When an actuating signal is applied to any of drive elements 33″–35″ and 37″–39″, the corresponding wedges are driven into near optical contact with block 30. When this occurs, total internal reflection at the interface adjacent the activated head is frustrated and light beam 41 passes through face 31 or 32, as the case may be, and is reflected at the back face of the wedge thereby shifting the angle of beam 41. Since beam 41 is reflected at each generating head position before being transmitted out of block 30, the angle increase provided by each head is additive.

In general, for a system having $n$ angle generating heads, equal increments of angle can be derived by a construction in which each succeeding head generates an angle which is twice the generated angle of the previous head. Hence, generating heads will be worth 1, 2, 4, 8, etc., units of angle and $2^n$ selections of angle will be available, including zero angle. If a Gray binary code is laid out, for example, in which each succeeding head increases the angle of the previous head by a factor of two, activation of the first, third and fourth heads, for example, commands the 1011 state, resulting in 13 increments of angle out of a possible $2^4 - 1 = 15$ increments. If each increment is 2 milliradians, then a 1011 state represents a 26 milliradian change of pointing from the zero position. In general, for four angle generating heads, 16 angles are available and yet for eight units, a selection of 256 angles becomes possible. The advantage of employing a substantial number of angle generators becomes outstanding in terms of the greatly increased angular resolution achieved and yet where expense, light losses and difficulty of control have increased but little.

The individual angle generating heads may include, for example, the piezoelectric drive element disclosed in my copending application Ser. No. 707,925, filed Feb. 21, 1968, entitled Optical Shutter. In said copending application, a piezoelectric element is operative to drive the wedge toward or away from a prism face so as to frustrate total internal reflection thereat. However, other configurations are possible as will be come clearer hereinafter.

Actuation of angle generating heads 33–35 and 37–39 has been considered hereinbefore as a displacement from the open to the closed gap condition. However, it should be apparent that reverse actuation is also practical, if the device is built with a gap closed in the rest position. For the former mode of operation, if drive elements 33″–35″ and 37″–39″ are as in the aforementioned copending patent application, application of a voltage pulse to the piezoelectric actuators causes an expansion which propagates through the drive element as an acoustic wavefront. This compression wave extends the armature to diminish the gap spacing and is reflected as a tension wave to further diminish the gap. Attenuation of reflections by use of lossy materials is feasible.

For either mode of operation, oscillation of the armature will occur if damping is not specifically provided and while this will not harm the device itself, it may have the effect of switching angle values at the natural frequency of the device. Therefore, damping techniques should be applied except in certain cases where armature oscillation is of no consequence or is even desirable. For example, for a Q-switched laser output pulse, which would be very short compared with the highest natural frequency of the armature, a single pointing angle is required and can be readily achieved. After the pulse is over, armature oscillation is of no consequence, provided it ceases before a following Q-switched pulse occurs, which would presumably be pointed at a slightly different angle.

There might be a special case in which repetitive light pulses are desirable and are acceptable at the armature natural frequency and where the same pointing angle is desired for each of a long train of pulses before changing to a new angle. In such a case, the armature oscillation can be of help, requiring only a small, easily derived low-voltage drive signal at each displacement, because of resonance amplification in the structure.

For wavelengths in the visible region, actuation rise times can be one to five microseconds for incidence angles near critical angle. For considerably larger incidence angles, actuation times can become of fractional microsecond duration, since a small movement then represents a well opened gap. For infrared light, it is necessary to pass through larger gap values for the same change on the curve of FIG. 2. Thus, longer actuation times are required in pointing a longer wave beam unless large incidence angles are used. Actuation time can also be effected by the choice of index of material to either side of the interface between surfaces 31 and 32 and the individual angle generating heads.

For a system having open gaps in the rest state, after beam 41 enters base block 30, it experiences no further loss by reflection until it leaves surface 43 after the desired number of additions of angle. In traversing interfaces 31 and 32, light is partly reflected and partly transmitted as represented by intermediate gap values of FIG. 2 as the armature still moves. However, in the closed gap position, a true and complete closure is not feasible, short of fusion of material, and thus, even upon closure there will still be some interface division of light between a high transmission of light along the new path and a slight reflection along the old path. Fortunately, this interface loss does not represent power dissipation (heating) in the material, thus allowing the loss to be compensated for by an increased intensity of input light to the pointing device. Light lost from the pointing direction remains as light along the zero deflection reference direction.

Only for occasional pointing angles of a value requiring actuation of most or all of the angle generating heads, will the decrease of transmission by the several percent loss per closed gap at each actuation unit be limiting to the system. As a result, it may be well to actually increase the number of angle generating heads above that needed for the angle resolution desired. Thus, instead of using a minimum number of angle generating heads, a greater choice of angle head can be made available so that the total number put in the closed gap condition at any one time will be reduced. In essence, a trade-off can be established between a bare minimum of angle heads, with an occasional low transmission, and a larger selection of angle heads to avoid the occasional low transmission. This would represent a departure from the binary code arrangement suggested earlier.

In a practical construction of the embodiment shown in FIG. 3, a unit measuring 1.3 x 1 x 0.5 inch provided a 2.2 inch optical path for an internal beam cross-section of ⅛ of an inch. Absorption loss was found to be negligible, particularly in comparison with interface losses. For a closed gap spacing of about 1/20 of a wavelength, transmission can be 95% per gap when using typical optical fabrication techniques, with even higher transmissions when using the best state of the art techniques. For eight generating heads, the system transmission will, therefor, vary from 99+% for zero beam deflection to 66% for actuation of all angle generating heads. Such a configuration, with 8 angle generating heads, can provide 256 different output angles or, for example, a total scan of 2.56° in 0.01° steps.

In a scanning system operating equally about an intermediate deflection angle, the maximum transmission can be improved by biasing the system for a zero-state half-deflection. Thus, for the construction of FIG. 3, the transmission would improve from 66% for 8 interfaces to 81% for 4 interfaces, at least half of the angle heads having open gaps and hence, lossless interfaces. With such a configuration, one bank of angle generating heads would be oriented for addition of angle increments to the reference bias angle upon actuation, while the other bank would have reversed reflecting wedge orientations, causing a subtraction of angle increments from the reference bias angle.

To allow equal control opportunity for both banks of angle generating heads, two identical binary angle codings must be employed, reducing the number of pointing increments from $2^n - 1 = 255$ for $n=8$, to $$2\left(2^{\frac{n}{2}} - 1\right) = 30$$

for two sets of four each. Thus, a choice must be made between substantial transmission drop for large peak deflection angles and a decrease of pointing resolution accompanying greater transmission at peak deflections.

In scanning a target in a rectangular raster pattern, the angle generator of FIG. 3 can provide the high speed sweep, while a mechanically actuated optic, or piezoelectrically tilted mirror, can provide the slower, cross-sweep. In some cases, two devices similar to that shown in FIG. 3, can be crossed to provide identical two-axis scans. Even with a single base block of the general type shown in FIG. 3, some of the angle generating heads can have wedges oriented at 90° to the rest to offer a measure of second axis pointing.

As suggested above, generation of angle increments using the principle of frustrated total internal reflection by piezoelectric displacement of an optic in the manner described in the aforementioned copending U.S. patent application, is not the only means of angle generation within the scope of the present invention. It is also feasible to employ the change of index of refraction of a liquid by change of pressure, as with a piezoelectric or other actuator. In general, the same system arrangement would be employed as with the angle generating heads shown in FIGS. 1a, 1b and 3; however, construction of the individual angle generating heads is different.

Figure 4:
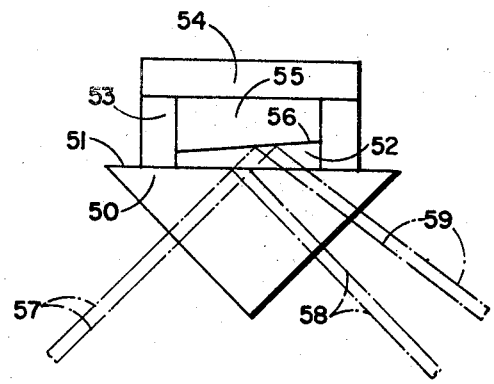
FIG. 4 is a schematic representation of a mechanical device for angle generation which uses pressure switching of the index of refraction of a liquid.

Referring now to FIG. 4, there is shown an angle generating head comprising an input-output block 50 of transparent material having a face 51 upon which is mounted a liquid wedge angle head 52. A piezoelectric actuator ring 53 forms one containing wall for liquid wedge 52. A cap 54 across the open end of ring 53 supports a wedge 55 of solid material, having a face 56 which is positioned at an angle to face 51 of input-output block 50. With such a configuration, contraction of piezoelectric ring 53 in a direction perpendicular to face 51 of block 50 compresses the liquid in wedge 52 to increase its index of refraction, thereby increasing the critical angle of incidence for total internal reflection. An increase of critical angle allows a light beam 57 incident on face 51 and initially totally reflected thereat to form an output beam 58 to be transmitted into the liquid to face 56 where it is reflected totally or by a metallic or dielectric film to form an output beam 59 at an angle to output beam 58. Thus, an increment of pointing angle is generated.

Figure 5:
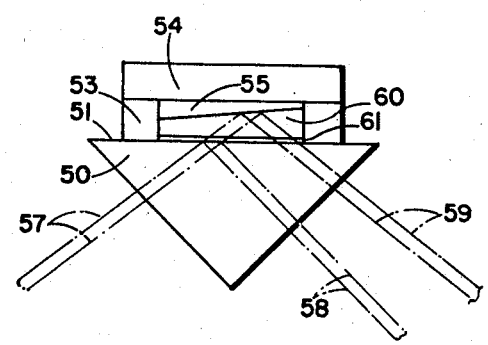
FIG. 5 is an alternate embodiment for an angle generator similar to that of FIG. 4 which uses the change of index of refraction of a liquid to switch an optical path.

Referring now to FIG. 5, there is shown a modified form of the apparatus of FIG. 4 in which a plane parallel piston of glass 60 is placed between wedge 55 and face 51 of block 50 leaving a plane parallel liquid-filled gap 61 between piston 60 and face 51. Piston 60 is made to fit ring 53 quite closely and yet, rather than allowing a reservoir to buffer the compression of liquid in flat gap 61, this cylindrical shell space is filled with a liquid or deformable solid selected for high compressibility.

With such a configuration, incident light beam 57 is normally reflected by total internal reflection at the solid-liquid planar interface 51. Upon pressurizing the liquid film in gap 61 to increase its index of refraction, light passes through the liquid into the transparent piston 60 and is reflected by coatings or by total internal reflection at the interface between piston 60 and wedge 55 along a path 59 at an angle to path 58 which is double the wedge angle of piston 60.

One objective of such a configuration is to employ a minimal volume of liquid to permit the piezoelectric displacement required to compress the liquid to be a minimum and hence allow the applied force to be a maximum, in view of the force-displacement trade-off characteristics of the piezoelectric elements. Another objective is to increase the response rate, since the rise time to compress the liquid is also reduced, where compression is to be achieved over a small volume of liquid. Delay time for the acoustic wave to propagate through the structure to reach the liquid is of no concern, as this delay can be accounted for in phasing of the operation. Rise time is further reduced because the smaller displacement required of the piezoelectric element allows use of a shorter element, giving a shorter wavelength of acoustic pulse. Time between the leading edge of the passing pulse and the peak of that pulse decreases with pulse width.

While the invention has been described with respect to several physical embodiments constructed in accordance therewith, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

I claim:
1. Means for pointing a beam of light comprising, in combination:
 a plurality of angle generating positions;
 a block of transparent material having first and second opposite faces, said beam of light being internally, alternately incident on said faces at positions corresponding to said angle generating positions;
 a plurality of wedges of transparent material positioned at each angle generating position having first and second angularly displaced faces, said first face being positioned parallel to said first and second faces of said block for selectively changing the angle of reflection at any of said positions; and
 means for driving said wedges relative to said block between a first position wherein said first face of said wedge and said block are in near optical contact and a second position wherein said first face of said wedge and said block are spaced by a distance of at least one wavelength of the light in said beam.

2. The beam pointing means of claim 1 wherein said beam of light is totally internally reflected at a face of said block when said wedge is in said second position, said beam of light passing into said wedge and being reflected by the second face thereof when said wedge is in said first position.

3. The beam pointing means of claim 1 wherein the angular displacement between the first and second faces of the wedge of each angle generating head is twice that of the preceding angle generating head whereby for $n$ angle generating heads, $2^n$ selections of angle are available.

4. The beam pointing means of claim 1 wherein each of said plurality of wedges comprises:
- a liquid wedge in contact with the corresponding first or second face of said block;
- a reflecting surface positioned at an angle to said corresponding face, said liquid wedge being positioned between said corresponding face and said reflecting surface; and
- means for compressing said wedge to increase the index of refraction thereof from a value where said beam of light is totally internally reflected at said corresponding face to a value where said beam of light passes through said corresponding face and is reflected by said reflecting surface.

5. The beam pointing means of claim 4 wherein the angle of the reflecting surface of each wedge is twice that of the preceding wedge whereby for $n$ angle wedges, $2^n$ selections of angle are available.

References Cited

UNITED STATES PATENTS

| | | | |
|---|---|---|---|
| 2,455,763 | 12/1948 | Harrison | 350—285 |
| 2,565,514 | 8/1951 | Pajes | 350—285 |
| 3,295,912 | 1/1967 | Fleisher et al. | 350—150 |
| 3,315,563 | 4/1967 | Harper et al. | 350—285 |
| 3,338,656 | 8/1967 | Astheimer | 350—285 |
| 3,360,324 | 12/1967 | Hora | 350—160 |
| 3,376,092 | 4/1968 | Kushner et al. | 350—285 |
| 3,437,400 | 4/1969 | Rosenberg | 350—150 |
| 3,443,098 | 5/1969 | Lewis | 350—285 |
| 3,450,455 | 6/1969 | Landre | 350—285 |

OTHER REFERENCES

Fleisher et al.: "Digital Indexed Angular Light Deflection System," IBM Technical Disclosure Bulletin, vol. 6, No. 5, October 1963.

RONALD L. WIBERT, Primary Examiner

J. ROTHENBERG, Assistant Examiner

U.S. Cl. X.R.

350—6, 286